(12) United States Patent
Abe et al.

(10) Patent No.: US 7,275,618 B2
(45) Date of Patent: Oct. 2, 2007

(54) ELECTRIC POWER STEERING DEVICE

(75) Inventors: Manabu Abe, Maebashi (JP); Kazuo Chikaraishi, Maebashi (JP); Atsushi Tanaka, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/512,068

(22) PCT Filed: Jan. 28, 2003

(86) PCT No.: PCT/JP03/00773

§ 371 (c)(1),
(2), (4) Date: Oct. 21, 2004

(87) PCT Pub. No.: WO03/091083

PCT Pub. Date: Nov. 6, 2003

(65) Prior Publication Data

US 2005/0167182 A1 Aug. 4, 2005

(30) Foreign Application Priority Data

Apr. 25, 2002 (JP) ............................. 2002-124050

(51) Int. Cl.
B62D 5/04 (2006.01)
(52) U.S. Cl. ....................... 180/443; 180/444
(58) Field of Classification Search ................ 180/443, 180/444
See application file for complete search history.

(56) References Cited

U.S. PATENT DOCUMENTS 6,872,771 B1 * 8/2004 Oka et al. ............... 74/388 PS
2001/0001932 A1 * 5/2001 Kobayashi et al. ...... 74/388 PS
2003/0000766 A1 * 1/2003 Tatewaki et al. ............ 180/444

FOREIGN PATENT DOCUMENTS

| EP | 1 106 475 | 11/2000 |
|---|---|---|
| EP | 1 127 773 A | 8/2001 |
| GB | 2 290 761 A | 1/1996 |
| JP | 56 116269 U | 9/1981 |
| JP | UM 116268/1981 | 9/1981 |
| JP | UM 167963/1989 | 11/1989 |
| JP | 8-11728 | 1/1996 |
| JP | 8-133102 | 5/1996 |

(Continued)

OTHER PUBLICATIONS

Mechanics of Materials fifth edition; James M. Gere (Published 2001), published by Brooks/Cole (thompson Learning)☐☐Appendix H, Table H-2.*

(Continued)

Primary Examiner—Lesley D. Morris
Assistant Examiner—Marlon Arce-Diaz
(74) Attorney, Agent, or Firm—Miles & Stockbridge P.C.

(57) ABSTRACT

To provide an electrically driven power steering apparatus with a simple structure, which can prevent overloading of an electrical motor and a power transmission system, an absorbing member (121) is attached to a rack shaft (112), and is brought into contact with a rack housing face at a stroke end of the rack shaft (112). The absorbing member (121) at least partially has a material having a Young's modulus of 100 to 900 Mpa, and thus it is possible to effectively relieve an impact at the stroke end.

11 Claims, 7 Drawing Sheets

FOREIGN PATENT DOCUMENTS

| | | |
|---|---|---|
| JP | 9-84300 | 3/1997 |
| JP | 9-221045 | 8/1997 |
| JP | 10-297504 | 11/1998 |
| JP | 11-222140 | 8/1999 |
| JP | 2001-219855 | 8/2001 |

OTHER PUBLICATIONS

Mehcanics of Materials third edition; Beer, Johnston, DeWolf (published 2002), published by McGraw-Hill. . . Appendix B, p. 749.*

* cited by examiner

ELECTRIC POWER STEERING DEVICE

TECHNICAL FIELD

The present invention relates to an electrically driven power steering apparatus, and more particularly, to an electrically driven power steering apparatus which can suppress the occurrence of noises.

BACKGROUND ART

One known type of electrically driven power steering apparatus of a vehicle is that rotational output of an electric motor, which gives an assistive steering torque, is reduced speed by a gear unit, then is transmitted to a moving shaft (rack shaft, etc.) of a steering mechanism, and assists the manual power of a steering wheel so that the moving shaft is moved reciprocally in a predetermined range in order to steer the wheels. Here, a moving member impinges on the rack housing at the stroke end (end) of the moving member, and thereby an impact might occur in the transmission route of the steering apparatus. Such an impact might cause damage on the electric motor and the power transmission mechanism.

In order to relieve or eliminate such an impact, in known techniques, a torque limiter has been disposed at the rotational shaft of an electric motor, etc. (Japanese Patent Laid-Open Publication No. 9-84300, or Japanese Patent Laid-Open Publication No. 9-221045).

However, in recent years, although there are demands for restraining the inertia of an electric motor for the reason of improvement of steering feeling, and the like, there is a problem in that, with the structure of incorporating a torque limiter in the electric motor, the inertial of rotational shaft becomes large, and the electric motor cannot be miniaturized. Also, with a structure in which a friction member is used for a function of the torque limiter, there has been a problem in that the torque limiter has a possibility of deteriorating from its initial level of performance as a result of wear-out of the friction member during its use over time.

To overcome such problems, in Japanese Patent Laid-Open Publication No. 8-11728, a disc spring is attached to the contact portion of the rack end of the rack shaft, which is a moving shaft, with the housing in order to absorb the impact of the stroke end. In such a structure, the problems as described above will not arise. However, when the disc spring is caused to function as an absorbing material in a limited space, an induced stress becomes high, and thus the load imposed on the disc spring might be high.

DISCLOSURE OF INVENTION

The present invention has been made in view of such problems of the known techniques, and it is an object of the present invention to provide an electrically driven power steering apparatus with a simple structure, which can prevent overloading of an electrical motor and a power transmission system.

An electrically driven power steering apparatus according to the first invention includes: a housing; a motor attached to the housing; a moving shaft to which an assistive steering force is inputted from the motor, and which is reciprocally movable within a range restricted by the housing in order to steer wheels; an input shaft connected to a steering wheel; power transmission means which connects the input shaft with the moving shaft in a power transmissible manner; an absorbing member which is attached to the moving shaft, and is brought into contact with the housing in face-to-face relation at an end of the reciprocal movement of the moving shaft; wherein the absorbing member has at least partially a material having a Young's modulus of 100 to 900 Mpa. Thus an impact at the end (stroke end) of the reciprocal movement of the moving member can be effectively relieved. A detailed description will be given on this point.

In a vehicle, a steering angle of wheels is set so as not to exceed a predetermined value in order to prevent interference of wheels with fenders and side members, etc. The steering angle of wheels is restricted, for example, in the case of a rack-and-pinion steering apparatus, by restricting the amount of the stroke of the rack. In this case, the stroke is restricted by bringing the ball joint provided at the end of the moving shaft (here, rack shaft) into contact with the rack housing. This is called end contact. When the moving of the moving shaft is blocked by end contact, a large inertia body such as a moving shaft, a steering wheel, etc. suddenly stop, thereby an impact axial force occurs on the moving shaft, and an impact torque occurs on the rotational shaft. In an electrically driven power steering apparatus, a rotational force is multiplied by reduction gears, and thus a motor inertia multiplied by a reduction gear ratio to the second power is added to an inertia around the steering wheel. Accordingly, the inertia of the steering system of the electrically driven power steering apparatus has increased to about two times compared with a hydraulically driven power steering apparatus.

In a normal use state excluding an accident, the state in which the most strong impact force occurs is the case where a worker directly steers the wheels to contact the ends in a state in which the vehicle is jacked up for vehicle maintenance, etc. In such a case, the moving speed of the moving shaft becomes four to five times the speed of a normal steering, and thus the impact force becomes the same times the impact force when contacting the end in a normal steering, such as a steering in a stop state. In the case of a hydraulically driven power steering apparatus, the torsional strength of the steering shaft will not reach 300 Nm, which is requested for a general passenger vehicle, and thus a problem in strength will not arise. However, in an electrically driven power steering apparatus, the inertia becomes about double, and thus, for example, the gear strength of the rack shaft and the pinion might be insufficient.

In order to reduce a peak load for absorbing, it is desirable to decrease the rigidity for increasing the deflection. However, the amount of deflection in a steering system cannot be increased more than is necessary. Meanwhile, when the moving shaft is provided with a disc spring in order to protect the rack shaft and the pinion gear as Japanese Patent Laid-Open Publication No. 8-11728, the input load to the disc spring must be considered not only for the end contact in the case of normal steering, but also the end contact in the case of jacking-up time as described above. When the input load becomes high, the amount of deflection of the disc spring proportionally increases as a matter of course. However, even in the case of the maximum deflection, the maximum steering angle of the tire described above must not be exceeded. Since the deflection of the end contact in the worst condition is about five times the end contact in a normal condition, the rack stroke in actual steering must be reduced by the amount of the maximum deflection. Thus the steering angle of the tire decreases by that amount. That is to say, if the rigidity of the spring is reduced in order to increase the absorbing effects, there is a problem in that the steering angle of the vehicle becomes insufficient, and thus the turning of the vehicle deteriorates, and the like. However, if the maximum deflection of the disc spring is kept small, the thickness of the spring member must be increased, and there is a problem in that the absorbing effect is reduced.

Accordingly, in the present invention, the amount of the maximum deflection of the absorbing member is suppressed by contacting the face of the absorbing member at the end of the reciprocal movement of the moving shaft. Furthermore, while the amount of the deflection is kept small at least partially using a material having a Young's modulus 100 to 900 Mpa for the absorbing member, the impact at the end (stroke end) of the reciprocal movement of the moving material is effectively relieved.

Here, if attention is paid to the Young's modulus of the material, when the durability of the absorbing member is considered, the strain rate thereof must be small. However, with an increase in the amount of deflection of the absorbing member, it is necessary to assure the volume is sufficiently enlarged by a comparable amount. Thus there is a limit of the increase in volume in a limited space. Normally, in a rack-and-pinion steering gear, the variation of stroke allowed from the vehicle is about ±1 to 2 mm, and thus it is desirable to have the rigidity such that the maximum deflection does not exceed 2 mm.

However, when the rigidity of the absorbing member is excessively high, the load that occurs at the maximum deflection becomes large, and the impact absorbing effect cannot be expected. Furthermore, if the load that occurs becomes the strength of the gear or more, the original purpose cannot be achieved.

Therefore, the maximum load and the maximum amount of deflection that occur have upper limit values ($F_{max}$, $\delta_{max}$), and it is necessary to keep the rigidity in a certain range in order to satisfy these. Also, in order to assure the reciprocal distance (rack stroke) of the moving shaft, and to succeed in suppressing the interference with surrounding parts, it is necessary to use a material having a Young's modulus in a certain limited range.

A flow of calculation for setting a specific Young's modulus E is shown. Assuming that a compressive stress is $\sigma$, a compressive load is F, a compressed area is S, and a strain is $\epsilon$, then $$E = \sigma/\epsilon = F/(S \cdot \epsilon). \quad (1)$$

Here, by considering a rough use condition, given F=30000 to 40000 (N), $\epsilon$=0.2 to 0.3 (strain rate 20 to 30%), and S=3 to $5 \times 10^{-4} (m^2)$, then Emax=666(MPa)

Emin=200(MPa)

Note that the load F slightly varies by a steering inertia, a motor inertia, and an impact input condition etc., and S varies slightly by the shape of the attachment such as a gear box, etc. Accordingly, it is determined that the Young's modulus E to be applied is desirably 100 to 900 (MPa), which becomes the above-described order.

FIG. 1 is a diagram of compressive load versus deflection for materials having different Young's moduli when impact energy is absorbed. The shaded areas are the impact absorption energy. In the figure, A shows the characteristic of a resin material, and B to D show characteristics of rubber materials having different Young's moduli. In a use under limited conditions described above, when energy absorption is properly attempted, if a Young's modulus E is about 1 to 10 (MPa), the rigidity of the absorbing member is insufficient, thus the amount of deflection becomes too large by absorbing the requested energy, and thereby the absorbing member might be broken. On the other hand, if a Young's modulus E is about 900 to 40000 (MPa), the rigidity of the absorbing member becomes too high, and the amount of deflection can be suppressed. However, the absorbing effect becomes insufficient, and thus the maximum load that occurs becomes too high. This is, of course, the same for materials having a Young's modulus of the above-described value or more. Also, a resin is used in a glassy state area, thus the toughness decreases, and a crack might undesirably occur. Accordingly, in FIG. 1, only the resins having the characteristics B and C fall within a black frame limited by Fmax and $\delta$maximum. The materials having such a characteristic include a polyurethane rubber.

An electrically driven power steering apparatus according to the second invention includes: a housing; a motor attached to the housing; a moving shaft to which an assistive steering force is inputted from the motor, and which is reciprocally movable within a range restricted by the housing in order to steer wheels; an input shaft connected to a steering wheel; power transmission means which connects the input shaft with the moving shaft in a power transmissible manner; an absorbing member which is attached to the moving shaft, and is brought into contact with the housing in face-to-face relation at an end of the reciprocal movement of the moving shaft; wherein the absorbing member includes a metal member and an elastic member formed by rubber or resin material, the metal member has a hole extending in the axial direction, and the elastic member attached to both ends of the metal member in the axial direction are connected through the hole. Therefore even if the adhesive strength between the metal member and the elastic member is not increased, the separation between the metal member and the elastic member is prevented, which results in excellent durability.

An electrically driven power steering apparatus according to the third invention includes: a housing; a motor attached to the housing; a moving shaft to which an assistive steering force is inputted from the motor, and which is reciprocally movable within a range restricted by the housing in order to steer wheels; an input shaft connected to a steering wheel; power transmission means which connects the input shaft with the moving shaft in a power transmissible manner; an absorbing member which is attached to the moving shaft, and is brought into contact with the housing in face-to-face relation at an end of the reciprocal movement of the moving shaft; wherein the absorbing member includes a metal member and an elastic member formed by rubber or resin material, and the elastic member is disposed at least at one of both end faces of the metal member in the axial direction, and between the metal member and the moving member. Therefore, the absorbing member can be attached without backlash by the elastic member between the metal member and the moving member appropriately deforming without improving the dimensional accuracy of the attachment part of the moving shaft. Also, it is possible to prevent the occurrence of a problem such as getting scratched with each other at the time of attachment, and the like.

BEST MODE FOR CARRYING OUT THE INVENTION

Figure 1:
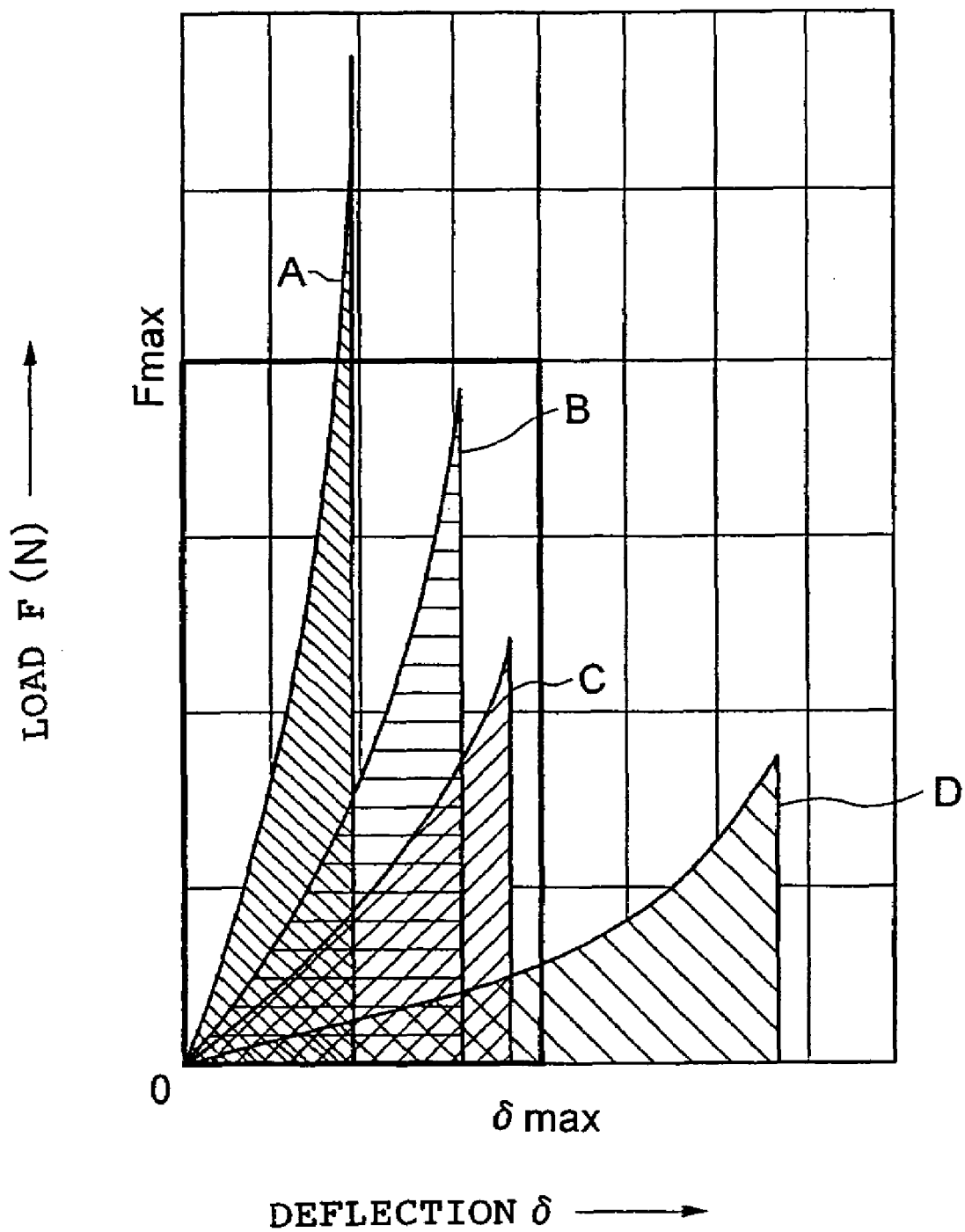
FIG. 1 is a diagram of compressive load versus deflection for materials having different Young's moduli when impact energy is absorbed.
Figure 2:
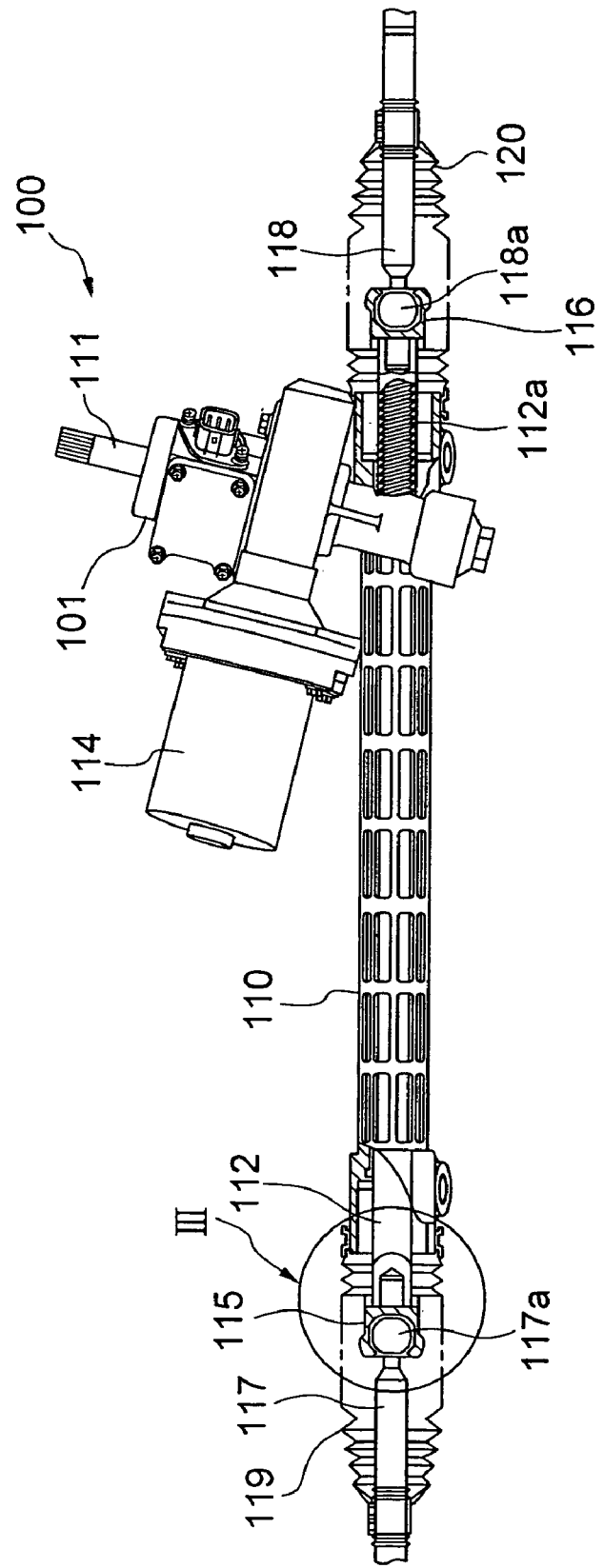
FIG. 2 is a front view, illustrating a partially sectional view in an axial direction, of an electrically driven power steering apparatus 100 according to a first embodiment.

In the following, a detailed description will be given below of embodiments of the present invention with reference to the drawings. FIG. 2 is a front view, illustrating a partially sectional view in the axial direction, of an electrically driven power steering apparatus 100 according to an embodiment of the present invention.

In FIG. 2, a housing is constituted by a housing main body 101 and a rack housing 110 extending therefrom in the electrically driven power steering apparatus 100. The housing main body 101 and the rack housing 110 are fixed to an unillustrated car body to integrally constitute the housing through an unillustrated bracket.

Inside the housing main body 101, an input shaft 111, which is connected to a steering shaft and a steering wheel (not shown) at one end, is extending obliquely from above in FIG. 2. On the other hand, a rack shaft 112, which is a moving shaft, is extending in the housing main body 101 and the rack housing 110. An unillustrated pinion is formed at the lower end in FIG. 2 of the input shaft 111, and engages with rack teeth 112a of the rack shaft 112. The rack shaft 112 moves in the right and left directions in FIG. 2 by the rotation of the input shaft 111. These pinion and rack teeth 112a constitute power transmission means.

A torque sensor (not shown) is provided in the housing main body 101. This torque sensor detects a torque applied on the input shaft 111 using the torsion of a torsion bar, and outputs a signal value corresponding to the torque. The structure thereof is well known, and thus details will not be described below.

Furthermore, reduction means (for example, an unillustrated worm gear mechanism) connected to the input shaft 111 is provided in the housing main body 101, thus the power from the rotating shaft (not shown) of an electric motor 114 attached to the housing main body 101 is reduced in speed, and transmitted to the input shaft 111. In this regard, the torque sensor and the electric motor 114 are connected to an unillustrated controller.

Spherical-end parts 117a and 118a of tie rods 117 and 118 are pivotably attached to ball joints 115 and 116, respectively, which are attached to engage with both ends of the rack shaft 112. Dustproof boots 119 and 120 are attached in the surroundings of the ball joints 115 and 116.

Figure 3:
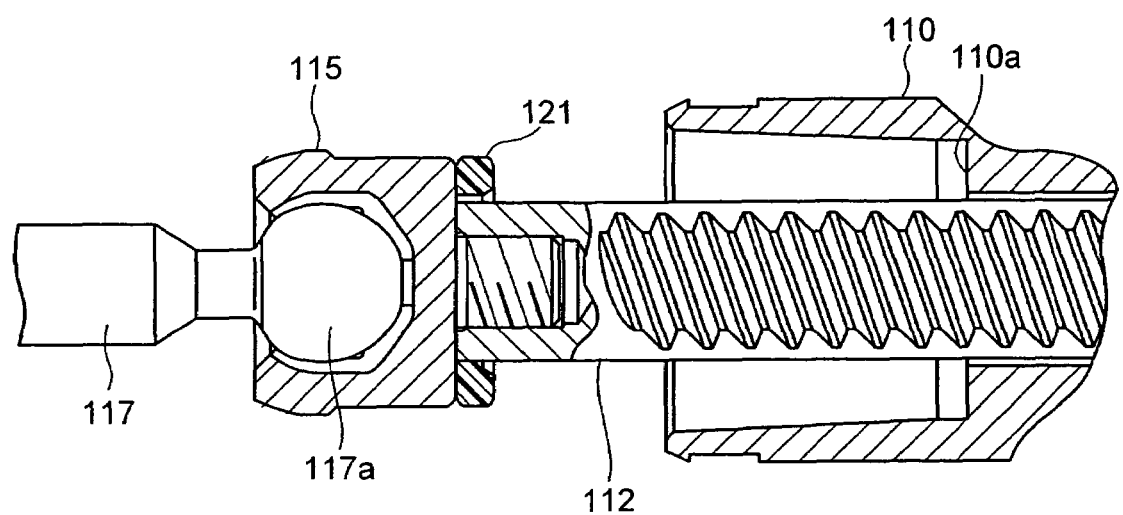
FIG. 3 is an enlarged view of a III portion of the electrically driven power steering apparatus in FIG. 2.
Figure 4:
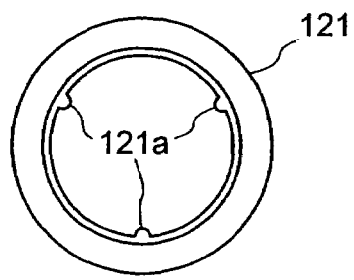
FIG. 4 is a top view of an absorbing member 121.

FIG. 3 is an enlarged view of a III portion of the electrically driven power steering apparatus in FIG. 2. In FIG. 3, a ring-shaped absorbing member 121 is disposed so as to contact with the end face (right-side end face in FIG. 3) of the ball joint 115 in the surroundings of the end of the rack shaft 112. As shown in the top view of FIG. 4, an absorbing member 121 has three projections 121a on the inner periphery. When the absorbing member 121 is attached to the outer periphery of the rack shaft 112, the absorbing member 121 is attached without backlash in the radial direction and in the axial direction by the projections 121a elastically deforming. Accordingly, the absorbing member 121 is reliably attached without improving the dimensional accuracy of the rack shaft 112. In this embodiment, the ring-shaped member 121 is formed only by an elastic material (for example, polyurethane) having a Young's modulus E=100 to 900 Mpa.

In the following, a description will be given of the operation of the electrically driven power steering apparatus 100 shown in FIG. 2. The input shaft 111 is rotated by the input of the steering torque from an unillustrated steering wheel, and the torque is transmitted to the rack shaft 112. In this case, the torque value detected by a torque sensor is sent to an unillustrated control circuit, and is compared with a predetermined value there. If the torque exceeds a predetermined value, an assistive steering power is necessary, and thus a drive command is issued in order to drive the electric motor 114. The electric motor 114 driven by the drive command rotates the input shaft 111 through the unillustrated speed reduction mechanism, and moves the rack shaft 112 in the axial direction. If the torque value detected by the torque sensor 113 is lower than the predetermined value, the assistive steering power is unnecessary, and thus the electric motor 114 is not driven.

Incidentally, the rack shaft 112 does not move infinitely. If the rack shaft 112 moves either in the right direction or left direction for a predetermined amount, the end (stroke end) of the reciprocal movement reaches, and the movement is restricted there. Here, in the vicinity of the stroke end, if a traveling wheel runs onto a paved step of sidewalk, or if a wheel is moved abruptly during maintenance, the rack shaft 112 moves quickly, and bumps against the stroke end, and the electric motor 114, which has been rotating at an operation speed multiplied by a reduction ratio, suddenly stops. The impact force by the inertia of the electric motor 114 is imposed on the speed reduction mechanism, and thus damage of gears, bearings, etc. might occur.

In such a case, by the electrically driven power steering apparatus according to the present embodiment, when the end face of the absorbing member 121, which moves with the rack shaft 112, collides with the end face 110a of the rack housing 110 at the stroke end, the absorbing member 121 relieves the impact force by the elastic deformation, and thus it is possible to suppress the occurrence of an impact force in the transmission system.

In a hydraulically driven power steering apparatus or a manual steering apparatus, the inertia affected by an impact load inputted is only the inertia of a steering system, such as a steering wheel, etc. Thus, in general, the inertia is about a moment of inertia of 400 (gf·cm·s$^2$). However, in an electrically driven power steering apparatus, in addition to the inertia of the steering system described above, in general, since a motor inertia of about a moment of inertia of 2 to 4 (gf·cm·s$^2$) is amplified by a reduction gear ratio to the second power, and is inputted, the impact load about three times that of a hydraulically driven power steering apparatus or a manual steering apparatus is inputted. Therefore, the absorbing effect of the absorbing member 121 is important.

Also, the impact load to be inputted into the absorbing member 121 is determined by the mass and the impact input speed converted from the above-described steering system inertia moment and the motor-shaft inertia moment into those on the rack shaft 112. The energy to be absorbed is determined by the compressive load and the deflection of the absorbing member 121, and thus it becomes necessary to properly set these factors. Thus, by forming the absorbing member 121 using the above-described material having an intermediate characteristics between rubber and plastic with a Young's modulus E of 100 to 900 (Mpa), for example, polyurethane rubber, it is possible to set the amount of the deflection necessary for absorbing effects to a proper value, and to decrease the maximum value of the impact load to a level without a problem.

In this regard, when the absorbing member 121 is installed, the rack stroke of the rack shaft 112 must be assured in a limited space, and thus the thickness thereof is limited. Also, from the rack diameter, which is set in order to assure necessary strength, the internal diameter of the absorbing member 121 is determined. Also, the outer diameter of the absorbing member 121 is restricted to a certain upper limit or less in order to prevent interference with the boots 119 and 120 and an unillustrated gear box. Accordingly, the dimension of the absorbing member 121 falls within a certain range.

Figure 5:
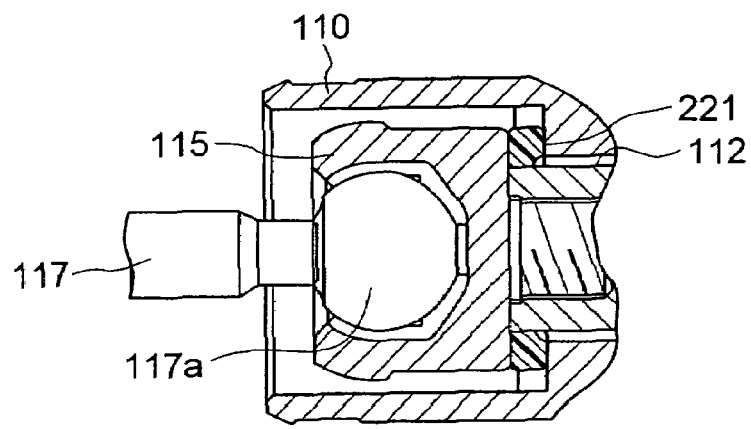
FIG. 5 is a sectional view, similar to FIG. 3, of an electrically driven power steering apparatus according to a second embodiment.

FIG. 5 is a sectional view, similar to FIG. 3, of an electrically driven power steering apparatus according to a second embodiment. In FIG. 5, an absorbing member 221 according to the second embodiment is formed only by a polyurethane material having a Young's modulus E in the range described above. However, unlike the embodiment in FIGS. 3 and 4, the absorbing member 121 does not have projections on the inner peripheral surface, and thus fits with the outer peripheral surface of the rack shaft 112 by the entire inner peripheral surface of the absorbing member 121.

Figure 6:
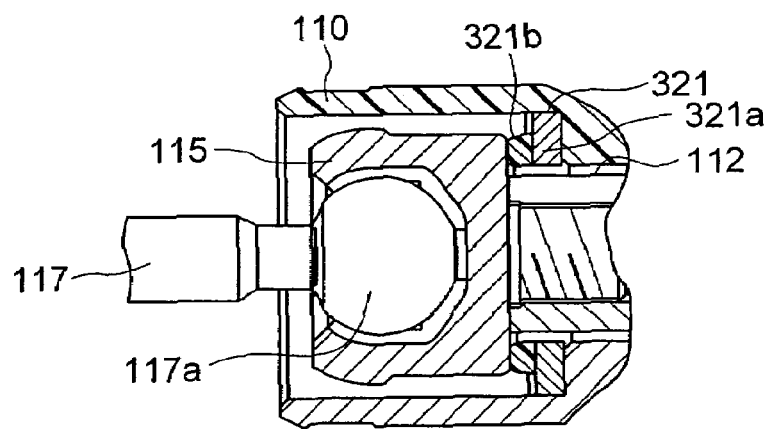
FIG. 6 is a sectional view, similar to FIG. 3, of an electrically driven power steering apparatus according to a third embodiment.

FIG. 6 is a sectional view, similar to FIG. 3, of an electrically driven power steering apparatus according to a third embodiment. In FIG. 6, an absorbing member 321 according to the third embodiment is formed by adhering a ring-shaped elastic member 321b made of a polyurethane material having a Young's modulus E in the range described above to the ball joint 115 side of a ring-shaped metal member 321a. In this regard, the metal member 321a is pressed into a hole in which the ball joint 115 of the housing 110 is accommodated. In such a case, the end face of the ball joint 115 contacts the elastic member 321b at the stroke end of the rack shaft 112.

Figure 7:
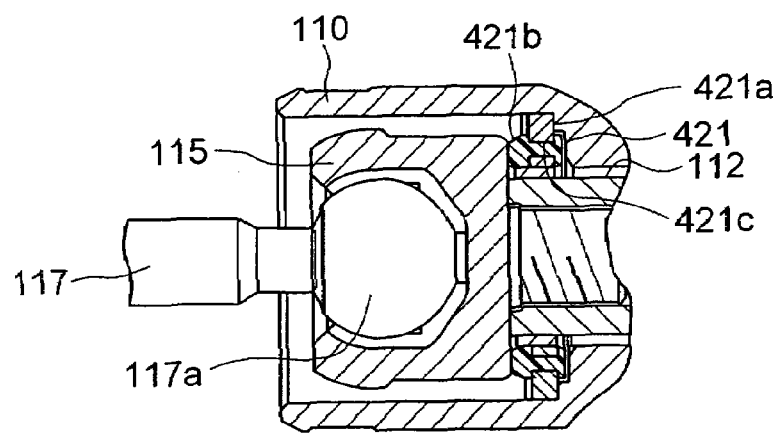
FIG. 7 is a sectional view, similar to FIG. 3, of an electrically driven power steering apparatus according to a fourth embodiment.

FIG. 7 is a sectional view, similar to FIG. 3, of an electrically driven power steering apparatus according to a fourth embodiment. In FIG. 7, an absorbing member 421 according to the fourth embodiment is formed by adhering a ring-shaped elastic member 421b made of a polyurethane material having a Young's modulus E in the range described above to both end faces of a ring-shaped metal member 421a in the axial direction. That is to say, both of the end faces are sandwiched by the elastic member 421b. The metal member 421a is pressed into a hole in which the ball joint 115 of the housing 110 is accommodated. In this regard, in this embodiment, a plurality of axial-direction holes 421c are formed along the periphery direction on the metal member 421a, and the elastic member 421b of both end faces of the metal member 421a is connected through the axial-direction holes 421c, and thus the metal member 421a and the elastic member 421b are strongly integrated, thereby having excellent handling and durability.

Figure 8:
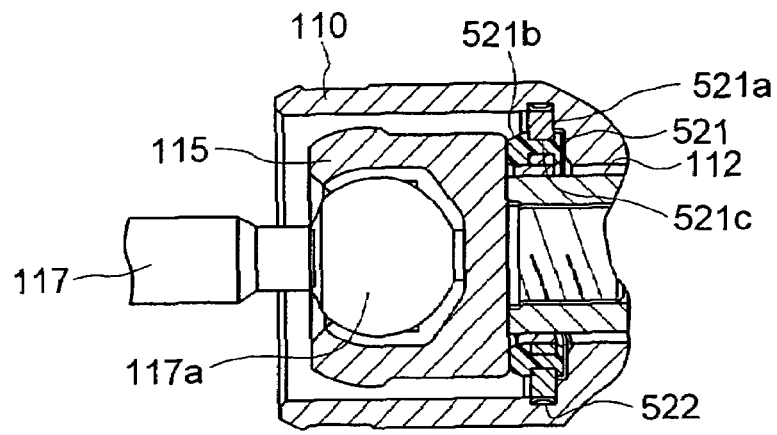
FIG. 8 is a sectional view, similar to FIG. 3, of an electrically driven power steering apparatus according to a fifth embodiment.

FIG. 8 is a sectional view, similar to FIG. 3, of an electrically driven power steering apparatus according to a fifth embodiment. In FIG. 8, an absorbing member 521 according to the fifth embodiment is formed by adhering a ring-shaped elastic member 521b made of a polyurethane material having a Young's modulus E in the range described above to both end faces of a ringshaped metal member 521a in the axial direction. That is to say, both of the end faces are sandwiched by the elastic member 521b. In this regard, in this embodiment, a plurality of axial-direction holes 521c are formed along the periphery direction on the metal member 521b, and the elastic members 521b of both end faces of the metal member 521a are connected through the axial-direction holes 521c, and thus the metal member 521a and the elastic member 521b are strongly integrated, thereby having excellent handling and durability. Also, a tolerance ring 522 is interposed between the metal member 521a and the rack housing 110.

Figure 9:
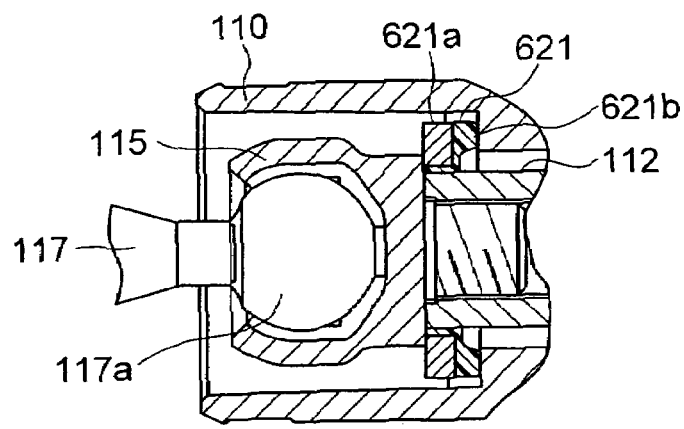
FIG. 9 is a sectional view, similar to FIG. 3, of an electrically driven power steering apparatus according to a sixth embodiment.

FIG. 9 is a sectional view, similar to FIG. 3, of an electrically driven power steering apparatus according to a sixth embodiment. In FIG. 9, an absorbing member 621 according to the sixth embodiment is formed by adhering a ring-shaped elastic member 621b made of a polyurethane material having a Young's modulus E in the range described above to the rack housing 110 side of a ring-shaped metal member 621a. In this regard, the elastic member 621b is attached to the inner peripheral surface of the metal member 621a in a film-like state, and this portion is properly deformed when being attached, and thus the absorbing member 621 can be easily attached to the outer peripheral surface of the rack shaft 112 without backlash.

Figure 10:
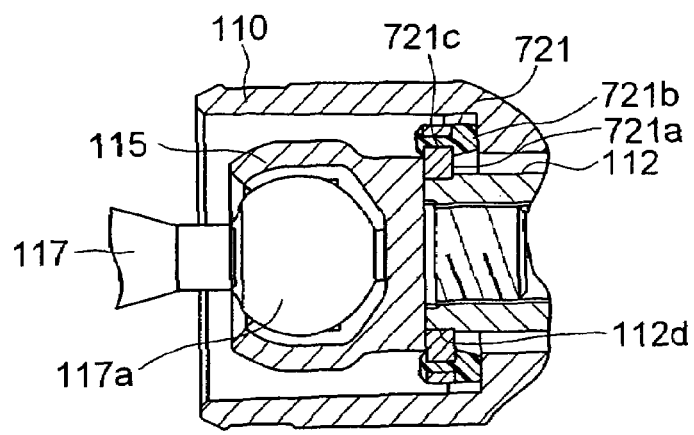
FIG. 10 is a sectional view, similar to FIG. 3, of an electrically driven power steering apparatus according to a seventh embodiment.

FIG. 10 is a sectional view, similar to FIG. 3, of an electrically driven power steering apparatus according to a seventh embodiment. In FIG. 10, an absorbing member 721 according to the seventh embodiment is formed by adhering a ring-shaped elastic member 721b made of a polyurethane material having a Young's modulus E in the range described above to both end faces of a ring-shaped metal member 721a in the axial direction. That is to say, both of the end faces are sandwiched by the elastic member 721b. In this regard, in this embodiment, a plurality of axial-direction holes 721c are formed along the periphery direction on the metal member 721b, and the elastic members 721b of both end faces of the metal member 721a are connected through the axial-direction holes 721c, and thus the metal member 721a and the elastic member 721b are strongly integrated, thereby having excellent handling and durability. Also, the inner peripheral surface of the metal member 721a fits about a diametrically reduced portion 112d of the rack shaft 112.

Figure 11:
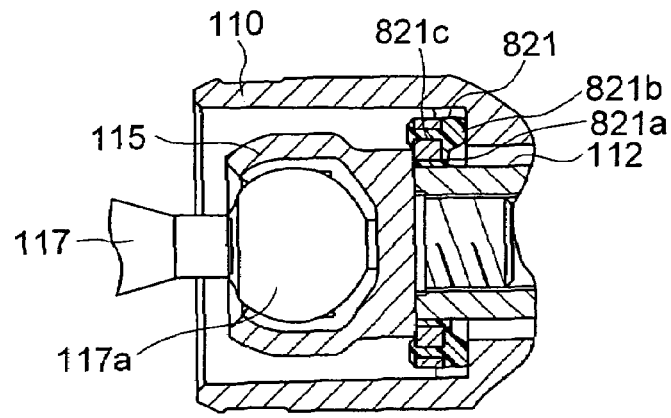
FIG. 11 is a sectional view, similar to FIG. 3, of an electrically driven power steering apparatus according to an eighth embodiment.

FIG. 11 is a sectional view, similar to FIG. 3, of an electrically driven power steering apparatus according to an eighth embodiment. In FIG. 11, an absorbing member 821 according to the eighth embodiment is formed by adhering a ring-shaped elastic member 821b made of a polyurethane material having a Young's modulus E in the range described above to both end faces of a ring-shaped metal member 821a in the axial direction. That is to say, both of the end faces are sandwiched by the elastic member 821b. In this regard, in this embodiment, a plurality of axial-direction holes 821c are formed along the periphery direction on the metal member 821b, and the elastic members 821b of both end faces of the metal member 821a are connected through the axial-direction holes 821c, and thus the metal member 821a and the elastic member 821b are strongly integrated, thereby having excellent handling and durability. Also, the elastic member 821b is attached to the inner peripheral surface of the metal member 821a in a film-like state, and this portion is properly deformed when being attached, and thus the absorbing member 821 can be easily attached to the outer peripheral surface of the rack shaft 112 without backlash.

Figure 12:
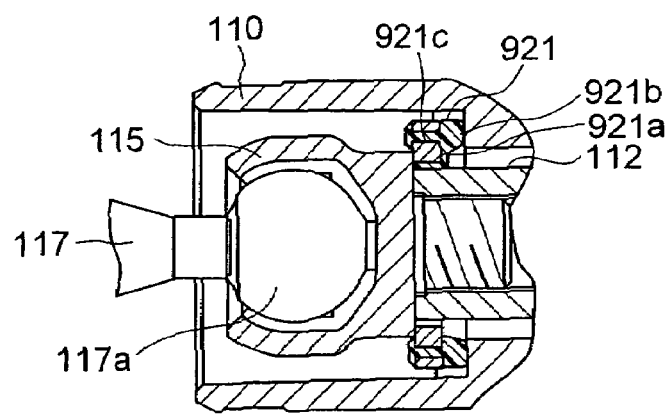
FIG. 12 is a sectional view, similar to FIG. 3, of an electrically driven power steering apparatus according to a ninth embodiment.

FIG. 12 is a sectional view, similar to FIG. 3, of an electrically driven power steering apparatus according to a ninth embodiment. In FIG. 12, an absorbing member 921 according to the ninth embodiment is formed by adhering a ring-shaped elastic member 921b made of a polyurethane material having a Young's modulus E in the range described above to both end faces of a ring-shaped metal member 921a in the axial direction. That is to say, both of the end faces are sandwiched by the elastic member 921b. In this regard, in this embodiment, a plurality of axial-direction holes 921c are formed along the periphery direction on the metal member 921b, and the elastic members 921b of both end faces of the metal member 921a are connected through the axial-direction holes 921c, and thus the metal member 921a and the elastic member 921b are strongly integrated, thereby having excellent handling and durability. Also, the elastic member 921b is partially attached to the inner peripheral surface of the metal member 921a in a film-like state, and this portion is properly deformed when being attached, and thus the absorbing member 921 can be easily attached to the outer peripheral surface of the rack shaft 112 without backlash.

Figure 13:
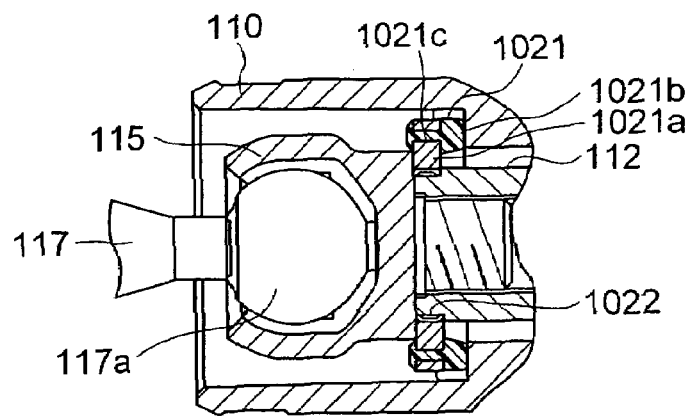
FIG. 13 is a sectional view, similar to FIG. 3, of an electrically driven power steering apparatus according to a tenth embodiment.

FIG. 13 is a sectional view, similar to FIG. 3, of an electrically driven power steering apparatus according to a tenth embodiment. In FIG. 13, an absorbing member 1021 according to the tenth embodiment is formed by adhering a ring-shaped elastic member 1021b made of a polyurethane material having a Young's modulus E in the range described above to both end faces of a ring-shaped metal member 1021a in the axial direction. That is to say, both of the end faces are sandwiched by the elastic member 1021b. In this regard, in this embodiment, a plurality of axial-direction holes 1021c are formed along the periphery direction on the metal member 1021b, and the elastic members 1021b of both end faces of the metal member 1021a are connected through the axial-direction holes 1021c, and thus the metal member 1021a and the elastic member 1021b are strongly integrated, thereby having excellent handling and durability. Also, a tolerance ring 1022 is disposed between the inner peripheral surface of the metal member 1021a and the outer peripheral surface of the rack shaft 112.

Figure 14:
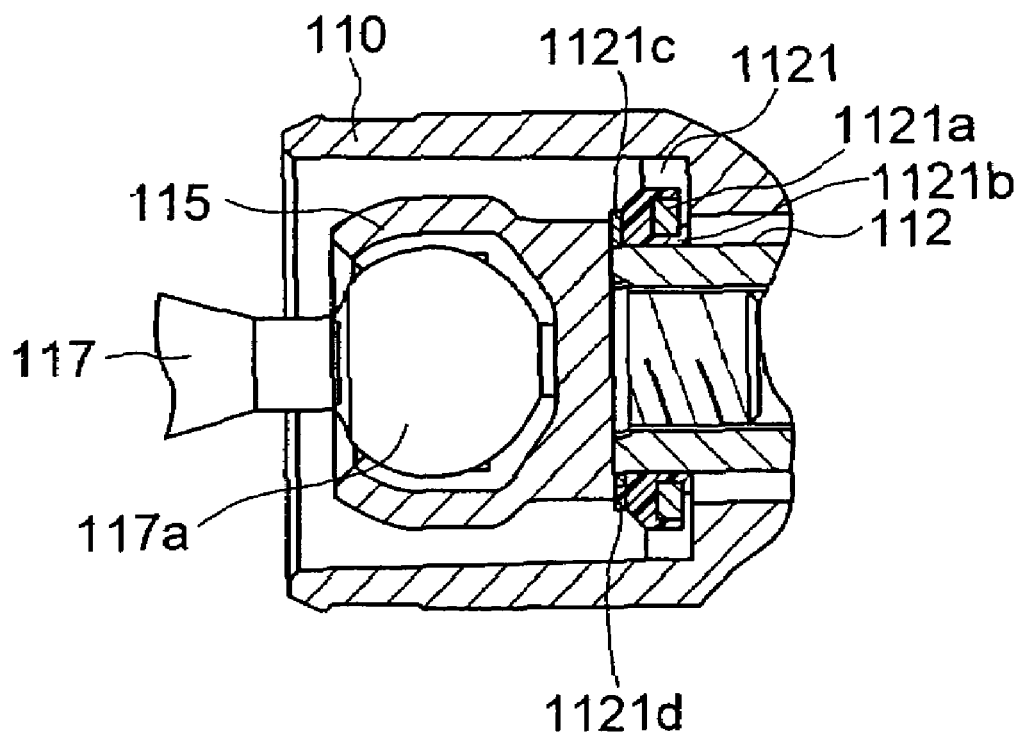
FIG. 14 is a sectional view, similar to FIG. 3, of an electrically driven power steering apparatus according to an eleventh embodiment.

FIG. 14 is a sectional view, similar to FIG. 3, of an electrically driven power steering apparatus according to an eleventh embodiment. In FIG. 14, an absorbing member 1121 according to the eleventh embodiment is formed by adhering a ring-shaped elastic member 1121b made of a polyurethane material having a Young's modulus E in the range described above mainly to the left side face of a ring-shaped metal member 1121a in the axial direction in the figure. This elastic member 1121b reaches the right side face through the inner peripheral surface of the metal member 1121a, and also reaches the outer peripheral surface of the metal member 1121a. Furthermore, a plate member 1121c is disposed at the left side face of the elastic member 1121b in the axial direction in the figure. Part of the elastic member 1121b intrudes in holes 1121d formed at regular intervals in the circumferential direction on the plate member 1121c, and thus both members are integrated. The plate member 1121c retains a bearing surface between the elastic member 1121b and the ball joint 115 at impact time, and contributes for relieving the stress thereof.

As described above, the present invention has been described with reference to the embodiments. However, the present invention should not be construed as being limited to the embodiments described above, and can be properly modified and improved as a matter of course. The present invention can be applied, for example, to a ball-screw type electrically driven power steering apparatus including a ball-screw shaft as a moving shaft.

As described above, according to an electrically driven power steering apparatus of the present invention, it is possible to provide an electrically driven power steering apparatus with a simple structure, which can prevent overloading of an electrical motor and a power transmission system.

The invention claimed is:

1. An electrically driven power steering apparatus comprising:
   a motor;
   a moving shaft to which an assistive steering force is inputted from the motor, and which is reciprocally movable within a range restricted by a housing in order to steer wheels;
   an input shaft connected to a steering wheel;
   a power transmission mechanism which connects the input shaft with the moving shaft in a power transmissible manner; and
   an absorbing member which is attached to one of the moving shaft and the housing, and is brought into contact with an abutment portion disposed on the other of the moving shaft and the housing to absorb an impact at an end of the reciprocal movement of the moving shaft;
   wherein the absorbing member comprises a material selected to satisfy the following relationships:

$$200 \leq \sigma/\epsilon \leq 666 (\mathrm{Mpa})$$

$$0.2 \leq \epsilon \leq 0.3$$

$$\sigma/\epsilon = F/(S \cdot \epsilon)$$

$$30,000 \leq F \leq 40,000 (N)$$

$$3 \times 10^{-4} \leq S \leq 5 \times 10^{-4} (\mathrm{m}^2),$$

where $\sigma$ is compressive stress, $\epsilon$ is strain, F is compressive load (N), and S is compressed area ($\mathrm{m}^2$).

2. A power steering apparatus according to claim 1, wherein the material of the absorbing member is a polyurethane material.

3. An electrically driven power steering apparatus comprising:
   a motor;
   a moving shaft to which an assistive steering force is inputted from the motor, and which is reciprocally movable within a range restricted by a housing in order to steer wheels;
   an input shaft connected to a steering wheel;

a power transmission mechanism which connects the input shaft with the moving shaft in a power transmissible manner; and an absorbing member which is attached to one of the moving shaft and the housing, and is brought into contact with an abutment portion disposed on the other of the moving shaft and the housing to absorb an impact at an end of the reciprocal movement of the moving shaft;

wherein the absorbing member includes a metal member and an elastic member, the metal member has a hole extending in the axial direction, and the elastic member is attached to both ends of the metal member in an axial direction and is connected through the hole in the metal member, the elastic member comprising a material selected to satisfy the following relationships:

$200 \leq \sigma/\epsilon 666 (Mpa)$ $0.2 \leq \epsilon \leq 0.3$ $\sigma/\epsilon = F/(S \cdot \epsilon)$ $30,000 \leq F \leq 40,000 (N)$ $3 \times 10^{-4} \leq S \leq 5 \times 10^{-4} (m^2)$, where $\sigma$ is compressive stress, $\epsilon$ is strain, F is compressive load (N), and S is compressed area ($m^2$).

4. A power steering apparatus according to claim 3, wherein the material of the elastic member is formed from a polyurethane material.

5. An electrically driven power steering apparatus comprising:

a motor;

a moving shaft to which an assistive steering force is inputted from the motor, and which is reciprocally movable within a range restricted by a housing in order to steer wheels;

an input shaft connected to a steering wheel;

a power transmission mechanism which connects the input shaft with the moving shaft in a power transmissible manner; and an absorbing member which is attached to one of the moving shaft and the housing, and is brought into contact with an abutment portion disposed on the other of the moving shaft and the housing to absorb an impact at an end of the reciprocal movement of the moving shaft;

wherein the absorbing member includes a metal member and an elastic member, and the elastic member has portions disposed at least at one of both end faces of the metal member in an axial direction, and between the metal member and the moving member, the elastic member comprising a material selected to satisfy the following relationships:

$200 \leq \sigma/\epsilon 666 (Mpa)$ $0.2 \leq \epsilon \leq 0.3$ $\sigma/\epsilon = F/(S \cdot \epsilon)$ $30,000 \leq F \leq 40,000 (N)$ $3 \times 10^{-4} \leq S \leq 5 \times 10^{-4} (m^2)$, where $\sigma$ is compressive stress, $\epsilon$ is strain, F is compressive load (N), and S is compressed area ($m^2$).

6. A power steering apparatus according to claim 5, wherein the material of elastic member is a polyurethane material.

7. An electrically driven power steering apparatus comprising:

a motor;

a moving shaft to which an assistive steering force is inputted from the motor, and which is reciprocally movable within a range restricted by a housing in order to steer wheels;

an input shaft connected to a steering wheel;

a power transmission mechanism which connects the input shaft with the moving shaft in a power transmissible manner; and an absorbing member which is attached to the moving shaft, and is brought into contact with an abutment portion disposed on the housing to absorb an impact at an end of the reciprocal movement of the moving shaft;

wherein the absorbing member includes a metal member and an elastic member formed from a resin or a rubber; and wherein the elastic member is brought into contact with the abutment portion of the housing to absorb an impact at the end of the reciprocal movement, and has a portion which is disposed between an inner periphery of the metal member and an outer periphery of the moving shaft, and which abuts the outer periphery along an entire axial length of the inner periphery of the metal member.

8. A power steering apparatus according to claim 7, wherein the elastic member comprises a material selected to satisfy the following relationships:

$200 \leq \sigma/\epsilon 666 (Mpa)$ $0.2 \leq \epsilon \leq 0.3$ $\sigma/\epsilon = F/(S \cdot \epsilon)$ $30,000 \leq F \leq 40,000 (N)$ $3 \times 10^{-4} \leq S \leq 5 \times 10^{-4} (m^2)$, where $\sigma$ is compressive stress, $\epsilon$ is strain, F is compressive load (N), and S is compressed area ($m^2$).

9. A power steering apparatus according to claim 8, wherein the material of the elastic member is formed from a polyurethane material.

10. A power steering apparatus according to claim 3, wherein the absorbing member is attached to the moving shaft, and the absorbing member and elastic member are brought into contact with the abutment portion of the housing to absorb an impact at the end of the reciprocal movement; and wherein the elastic member has a portion disposed between an inner periphery of the metal member and an outer periphery of the moving shaft and abuts the outer periphery along an entire axial length of the inner periphery of the metal member.

11. A power steering apparatus according to claim 5, wherein the absorbing member is attached to the moving shaft, and the absorbing member and elastic member are brought into contact with the abutment portion of the housing to absorb an impact at the end of the reciprocal movement; and wherein the elastic member has a portion disposed between an inner periphery of the metal member and an outer periphery of the moving shaft and abuts the outer periphery along an entire axial length of the inner periphery of the metal member.

* * * * *